(12) United States Patent
Kumar et al.

(10) Patent No.: US 8,291,748 B2
(45) Date of Patent: *Oct. 23, 2012

(54) HEAT EXCHANGER LEAK TESTING METHOD AND APPARATUS

(75) Inventors: Hemant Kumar, Goldsboro, NC (US); Jonathan Graham Shaw, Goldsboro, NC (US)

(73) Assignee: APV North America, Inc., Getzville, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/872,069

(22) Filed: Aug. 31, 2010

(65) Prior Publication Data

US 2011/0000284 A1     Jan. 6, 2011

Related U.S. Application Data

(63) Continuation of application No. 11/951,925, filed on Dec. 6, 2007, now Pat. No. 7,886,580.

(51) Int. Cl.
*G01M 3/04* (2006.01)

(52) U.S. Cl. ......................................................... 73/40.7

(58) Field of Classification Search ................... 73/40.7, 73/49.2, 49.3
See application file for complete search history.

(56) References Cited

U.S. PATENT DOCUMENTS

| | | | |
|---|---|---|---|
| 3,975,943 A | 8/1976 | Brachet | 73/40 |
| 4,918,975 A | 4/1990 | Voss | 73/40.7 |
| 5,872,308 A | 2/1999 | Bowling | 73/40 |
| 6,009,745 A | 1/2000 | Shaw et al. | 73/40.7 |
| 6,035,700 A | 3/2000 | Shaw | 73/40.7 |
| 6,044,692 A | 4/2000 | Bowling | 73/40.5 A |
| 6,062,068 A | 5/2000 | Bowling | 73/40 |
| 6,314,794 B1 | 11/2001 | Seigoit | 73/40.7 |
| 6,948,551 B1 | 9/2005 | Famme | 165/11.1 |
| 7,150,180 B2 | 12/2006 | Werner | 73/40.7 |
| 2007/0157704 A1 | 7/2007 | Jenneus et al. | 73/40.7 |

FOREIGN PATENT DOCUMENTS

| | | |
|---|---|---|
| GB | 2314421 A | 12/1997 |
| GB | 2396923 | 3/2005 |
| WO | WO 95/16900 | 6/1995 |

*Primary Examiner* — Daniel Larkin
(74) *Attorney, Agent, or Firm* — Baker & Hostetler LLP

(57) ABSTRACT

A method for detecting the presence of a leak between two fluid paths of an assembled plate heat exchanger by evacuating one or both fluid paths to a low pressure, introducing a test gas to one of the fluid paths to create a pressure differential between the fluid paths, and testing for the presence of test gas in the second fluid path.

12 Claims, 1 Drawing Sheet

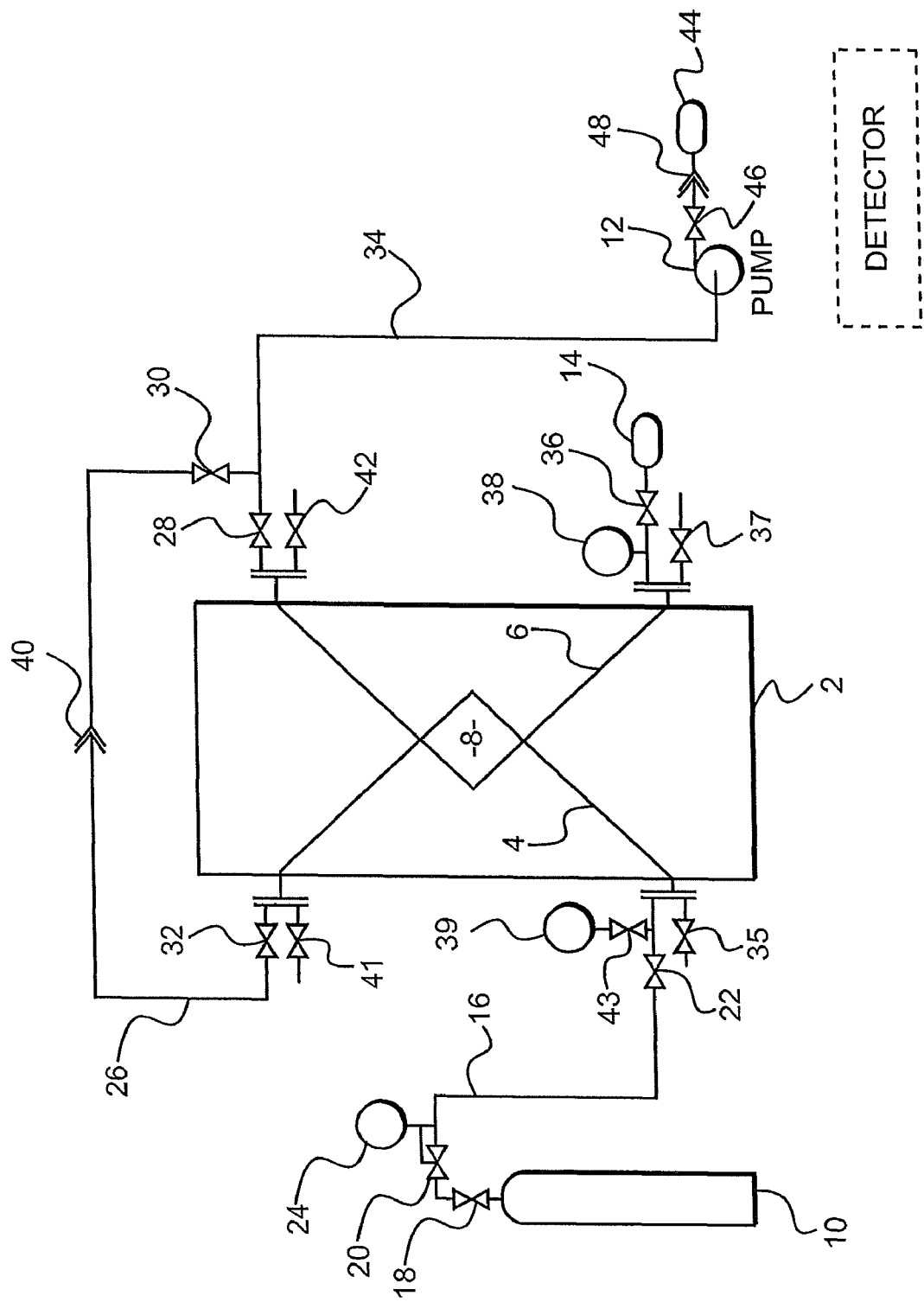

HEAT EXCHANGER LEAK TESTING METHOD AND APPARATUS

CROSS-REFERENCE TO RELATED APPLICATIONS

This application is a continuation of U.S. Non-provisional patent application entitled, "HEAT EXCHANGER LEAK TESTING METHOD AND APPARATUS," filed Dec. 6, 2007, now U.S. Pat. No. 7,886,580, entitled "HEAT EXCHANGER LEAK TESTING METHOD AND APPARATUS" Ser. No. 11/951,925, the disclosure of which is hereby incorporated by reference in its entirety.

FIELD OF THE INVENTION

This invention generally relates to heat exchangers for fluids. In particular, the invention relates to a method and apparatus for leak testing a heat exchanger, especially, but not exclusively, a plate heat exchanger.

BACKGROUND OF THE INVENTION

Heat exchangers typically comprise separate flow paths for two fluids arranged in close contact to facilitate heat transfer between the fluids thereby cooling the higher temperature fluid while simultaneously heating the lower temperature fluid as they flow through the heat exchanger. In plate heat exchangers the flow paths are commonly provided by a series of metallic plates packed vertically in sequence with gaskets between the plates to seal the plates and separate the flow paths. This arrangement allows complex flow paths of long length for optimum heat transfer to be achieved.

Plate heat exchangers are commonly used for food processing where one of the fluids is a food product to be heated or cooled by heat exchange with the other fluid. To maintain quality of the food product being processed, it is important to avoid the food product being contaminated by cross-flow between the flow paths within the heat exchanger. To this end it is routine practice to check plate heat exchangers for any faults that may allow cross-flow to occur. Assembly/disassembly of plate heat exchangers is time consuming and it is desirable to be able to carry out such checks on the assembled heat exchanger so that disassembly for repair is only required when a leak is detected.

To this end, various methods have been proposed in the prior art for leak testing an assembled plate heat exchanger. However, these methods are generally not satisfactory for detecting small faults such as fatigue cracks or corrosion pinholes that can occur in the heat exchanger plates. While such faults may only allow a very small amount of cross-flow to occur, the resulting contamination of the food product is such that it must be thrown away and the heat exchanger disassembled to find and repair the fault. This is wasteful of the food product and time consuming to carry out a repair, all of which adds to cost.

SUMMARY OF THE INVENTION

The present invention has been made from a consideration of the foregoing and seeks to provide a method and apparatus for leak testing a heat exchanger where these problems are at least mitigated.

Thus, it is a desired aim of the present invention to provide a method and apparatus for leak testing a heat exchanger, especially a plate heat exchanger, that is capable of detecting smaller faults in the heat exchanging portions of the heat exchanger than hitherto possible without disassembly of the heat exchanger.

From one aspect, the invention generally provides a method for detecting the presence of a leak between two fluid paths of a heat exchanger. In one step of the method, at least one of the fluid paths may be evacuated to a low pressure. In another step of the method, a test gas may be introduced to one of the fluid paths to create a pressure differential between the fluid paths. In another step of the method, a test for the presence of test gas in the second fluid path may be carried out.

In one preferred embodiment, the method comprises sealing a test section including first and second fluid paths; evacuating said first and second fluid paths, introducing a test gas to said first fluid path so that a pressure differential is created between said first fluid path and said second fluid path, and testing for the presence of said test gas in said second fluid path whereby the presence of a leak between said first and second fluid paths of said test section may be determined.

Preferably, the first and second fluid paths are evacuated to substantially the same pressure prior to introducing the test gas to the first fluid path. Typically, the evacuated pressure is below atmospheric pressure and is preferably below 0.5 bar and more preferably is about 0.1 bar or less.

Preferably, the second fluid path is evacuated at or near to one end of the test section and the test gas is introduced into the first fluid path at or near to the other end of the test path. Typically, test gas is introduced to the first path to a pressure above atmospheric pressure, preferably at least 2 bar and more preferably about 4 bar.

Preferably, the presence of the test gas in the second fluid path is detected by testing fluid evacuated from the second fluid path. For example, fluid evacuated from the second fluid path after the introduction of test gas to the first fluid path may be collected in a vessel provided with a detector for testing for the presence of the test gas.

In some embodiments, fluid evacuated from the second fluid path for testing includes a tracer gas introduced to the second fluid path after the introduction of test gas to the first fluid path. Preferably, the tracer gas flows through substantially the entire second fluid path whereby test gas that leaks from the first fluid path to the second fluid path at any point is picked up and evacuated from the second fluid path with the tracer gas.

The tracer gas may be introduced to the second fluid path in one or more separate volumes. Alternatively, a controlled flow of the tracer gas may be provided and detection of test gas in the tracer gas evacuated from the second fluid path used to locate the position of a leak between the first and second fluid paths Preferably, the test gas is hydrogen which may be mixed with an inert gas such as nitrogen to reduce the risk of an explosion. Where provided the tracer gas may be air.

The method may one or more of cleaning, draining and drying the test section prior to commencing the test procedure. The method has particular application to detecting leaks in assembled plate heat exchangers. For the sake of completeness, it should be added that the leaks to be discovered are preferably those lying in the heat exchanging portions of the plate heat exchanger. It will be readily recognised that the two fluid paths preferably overlap side by side in the heat exchange zone only.

From another aspect, the invention generally provides apparatus for detecting the presence of a leak between two fluid paths of a heat exchanger. The apparatus may be provided with means for evacuating at least one of the fluid paths to a low pressure. The apparatus may be provided with means for introducing a test gas to one of the fluid paths to create a pressure differential between the fluid paths. The apparatus may be provided with means for testing for the presence of test gas in the second fluid path.

In a preferred embodiment, the apparatus comprises a means for evacuating a sealed test section including said first and second fluid paths a means for introducing a test gas to said first fluid path such that the first fluid path is at a higher pressure than the second fluid path whereby a pressure differential is created between said first and second fluid paths, and a means for testing for the presence of test gas in the second fluid path.

Preferably, the evacuation means comprises a vacuum pump connected to the first and second fluid paths, and valve means is provided for selectively isolating each of the first and second fluid paths from the evacuation means.

Preferably, the gas introduction means comprises a gas cylinder connected to the first fluid path, and valve means is provided for isolating the gas introduction means from the first fluid path.

Preferably, the testing means comprises a detector for detecting the presence of the test gas in fluid evacuated from the second fluid path.

In some embodiments, means is provided for introducing a tracer gas to the second fluid path and valve means is provided for isolating the tracer gas introduction means from the second fluid path.

Preferably, tracer gas introduction means provides a controlled flow of tracer gas and the amount of test gas in the tracer gas is monitored over time for determining an approximate location of a leak in the test section.

The invention will now be described in more detail by way of example only with reference to the accompanying drawings.

BRIEF DESCRIPTION OF THE DRAWINGS

The single FIGURE is a schematic layout of system for leak testing a plate heat exchanger embodying the method and apparatus of the present invention.

DETAILED DESCRIPTION

In the following description, the construction of the plate heat exchanger is not shown and described in detail as such heat exchangers are familiar to those skilled in the art and do not form an essential part of the invention which, as will be apparent from the following description, has application to all types and constructions of plate heat exchangers as well as other types of heat exchangers where separate flow paths for two fluids are arranged in close contact to facilitate heat transfer between the fluids.

Referring to the drawing, the two flow paths of a plate heat exchanger 2 are depicted as a donor side 4 and a receiving side 6 and are shown as being in close contact within a heat transfer section 8 of the heat exchanger. The terms "donor side" and "receiving side" are used hereinafter purely to distinguish between the flow paths for the purpose of clarity and are not descriptive of the heat exchanger 2 and are therefore not limiting on the scope of the invention.

The system for leak testing the plate heat exchanger 2 includes a source 10 of a test gas such as, but not limited to, hydrogen (typically 5% hydrogen and 95% nitrogen or other inert gas although other ratios may be employed), a vacuum pump 12 and for at least some modifications an elastic vessel 14 containing a tracer gas (typically, but not limited to, air).

The hydrogen source 10 is connected to the donor side 4 by a line 16 provided with valves 18 and 22 between which is fitted a gas pressure regulator 20 with outlet pressure gauge 24. The vacuum pump 12 is connected to the receiving side 6 by a line 34 containing valve 28. The donor side 4 is connected to the receiver side 6 using line 26 fitted with valves 30 and 32. Between valves 30 and 32 is fitted a quick disconnect 40. Line 26 connects to line 34 at a point between valve 28 and the vacuum pump 12.

Prior to the test procedure, the test section is normally thoroughly cleaned in place (CIP) using existing CIP procedures adopted by the end user to normally clean the equipment. It is then flushed with clean water to remove trace wash chemicals. However, such cleaning is not essential to the invention and may be omitted. Next, if free drainage of the test section is not possible, then forced drainage (blast out) using a blast of gas such as compressed air or nitrogen is employed. Connection of air lines can be made to valves 35 and 37 with exhaust from valves 41 and 42. This blow down may be repeated several times for both sides using different pressure or gas release rates until both sides are sufficiently drained to ensure that the heat transfer area is not covered by a standing water level. The test section is now ready for the test procedure. In a modification, a hot gas such as hot air may be circulated through one or both sides 4,6 of the test section before starting the test procedure. The hot gas may help to dry liquid held by capillary action in any faults in the plates separating the donor side 4 and receiving side 6 after the initial cleaning and/or draining stages.

The first step of the test procedure is to seal the test section by closing valves 35, 37, 41 and 42. The vacuum pump 12 is then started and valves 28, 30, 32 opened to connect the pump 12 to the donor side 4 and receiving side 6. The vacuum pump 12 is operated to evacuate the donor side 4 and receiving side 6 to a low pressure, typically about 0.1 bar (10 kPa) or lower, as indicated by vacuum gauges 38 and 39 connected to the receiving and donor side respectively. Valves 28,30 and 32 are closed and the vacuum pump 12 stopped. The evacuation to low pressure helps to evaporate and remove liquid that may be held by capillary forces in any fault in the plates separating the donor side 4 and receiving side 6 thereby improving sensitivity of the test procedure to detect such faults.

After a period of time, say 10 minutes, the readings on the vacuum gauges 38 and 39 are checked to ensure the system is sealed. If the pressure has increased, the system seal is checked and the step repeated until the low pressure is maintained. The next step of the test procedure is to positively disconnect the donor side 4 and receiving side 6 by means of a quick connection coupling 40 situated between the valves 30,32. Use of the disconnect ensures that the donor and receiver sides are positively isolated from each other rather than just relying on the integrity of valves 30 and 32 for positive isolation. Valve 43 is now closed to isolate vacuum gauge 39. Valve 18 is opened to connect the hydrogen source to the regulator 20 and the pressure as measured on the regulator outlet increased until it reads approximately 4 bar (400 KPa) or higher then valve 22 is opened to charge the donor side 4. After charging is complete valves 22 and 18 are closed.

Since the donor side 4 was evacuated to low pressure before pressurizing with the test gas, the test gas can flow more easily throughout all of the donor side 4 without being diluted by air present in the donor side before evacuation. The donor side 4 is now at a significantly higher pressure than the receiving side 6 and the test gas can flow readily from the donor side 4 to the receiving side 6 only through any faults present in the heat transfer area of the plates separating the donor side 4 and receiving side 6. After a period of time, say 15 minutes, an empty elastic vessel 44 such as a plastic bag, is connected to the vacuum pump outlet via a valve 46 and quick disconnect 48. The vacuum pump 12 is started and valve 28 opened to begin gas collection from the receiver side into the elastic vessel 44. On filling vessel 44, the can be removed via the disconnect 48 and the gas tested with a suitable detector (not shown). The presence of hydrogen in the collected gas indicates the presence of a fault in the plates separating the donor side 4 and the receiving side 6. In a modification to the above procedure another elastic vessel 14 is filled with a tracer gas (typically air) and connected to valve 36 before any gas collection into vessel 44 commences. During gas collection into vessel 44, valve 36 is opened and the tracer gas passed into the receiving side 6. The tracer gas spreads throughout the receiving section and is enriched with any hydrogen that has passed from the donor side 4 to the receiving side 6. The evacuated gas (tracer gas plus any leaked hydrogen) is again collected in the vessel 44 and tested to determine the presence of a leak between the donor side 4 and the receiving side 6.

The introduction of the known volume of tracer gas in the vessel 14 to the receiving side 6 assists detection of a small fault in a large, complex heat exchanger where the test section may have long, tortuous flow paths that make recovery and detection of very small volumes of hydrogen leaking from the donor side 4 to the receiving side 6 more difficult and problematic. Thus, the tracer gas raises the pressure in the receiving side 6 slightly, although the pressure is still substantially below the pressure of the test gas in the donor side 4, and, because the receiving side 4 is still at low pressure, the tracer gas can spread rapidly throughout the receiving side 6 so that any hydrogen present in the receiving side 6 can be more completely removed along with the tracer gas and detected when the receiving side 6 is evacuated. This may be further enhanced by arranging for the receiving section 6 to be evacuated at one end and the tracer gas to be introduced at the other end so that the tracer gas flows through the entire section under test.

In a further modification, the tracer gas is introduced more than once—multiple shots—and the receiving section 6 evacuated after each introduction of tracer gas to ensure that any hydrogen leaking from the donor side 4 to the receiving side 6 from a fault in the plates separating the donor side 4 and receiving side 6 anywhere in the test section has been found.

In a further modification, the tracer gas is introduced to the receiving section 6 at or near to one end of the test section as a steady flow while evacuating the receiving section 6 at or near to the other end of the test section. In this way, it is possible to approximately correlate the position of the fault in the plate from a study of the hydrogen concentration in the tracer gas versus time at the detecting end of the test section.

The above-described method in which both sides of the test section—the donor side 4 and receiving side 6—are evacuated prior to introduction of the test gas to the donor side 4 and, where employed, tracer gas to the receiving side 6 improves the detection of test gas that has leaked from the donor side 4 into the receiving side 6. As a result, the method can detect faults where only a small volume of test gas leaks into the receiving section making it particularly suitable for heat exchangers having long, complex, tortuous flow paths where small volumes of leaked test gas may be less easy to collect and detect. However, for heat exchangers where the flow paths are of simpler construction with shorter, less complex and tortuous flow paths, it may not be necessary to evacuate both sides of the test section in order to collect and detect test gas that has leaked into the receiving section through a fault in the heat transfer area of the test section.

Thus, the invention includes a method in which only one side of the test section, for example the receiving side, is evacuated before introducing the test gas at an elevated pressure to create a pressure differential between the donor side and receiving side such that test gas flows into the receiving side through any fault in the heat transfer area of the test section.

A plate heat exchanger may comprise one or more sections and where more than one section, each section may be tested separately in turn for leaks or two or more or all sections may be linked and tested simultaneously for leaks. Whichever option is employed may depend on the arrangement and complexity of the flow paths in each section.

As will be appreciated, the invention provides a method and apparatus for testing a plate heat exchanger for leaks while assembled that enables even small faults such as hairline cracks or pinholes to be detected in a reliable manner. In its broadest application, the test provides an indication of the presence/absence of a leak so that only heat exchangers found to have a leak need to be disassembled for repair thereby reducing or avoiding unnecessary disassembly. In one preferred embodiment, the position of a leak within the heat exchanger may be approximately determined so that the plate with the fault can be more easily located on disassembly of the heat exchanger.

The invention has particular application to leak testing plate heat exchangers of the type in which flow paths for two heat exchange fluids are provided by a package of plates, typically metal or other material having a high thermal conductivity for heat transfer, arranged in sequence with gaskets between the plates to seal the plates and separate the flow paths such that the flow paths extend side by side rather than one inside the other and at least partially overlap side by side in the heat exchanging zones of the surfaces. While the invention has been described with particular application to detecting a leak in a plate heat exchanger, it will be understood that the invention has wider application to other types and constructions of heat exchanger having flow paths arranged in close contact for heat exchange between fluids flowing through the flow paths.

It will also be understood that while the invention has been described with reference to embodiments illustrating the best method and apparatus currently known to the inventors, variations and modifications to the method and apparatus may be made without departing from the principles or concepts described herein. For example, the test gas. and, where provided, tracer gas, may comprise any suitable gas or mixture of gases that enable the presence of test gas in the receiving section to be readily detected. The donor side and receiving side may be evacuated to around 0.1 bar or described or any other suitable low pressure while the donor side may be charged with test gas at around 4 bar or any other suitable high pressure. As used herein "low pressure" and "high pressure" are used to indicate the existence of a pressure differential sufficient for test gas to flow from the donor side to the receiving side through any faults in the plates separating the donor side and receiving side and the actual pressures may vary from those given without altering the operation of the invention.

What is claimed is:

1. A method for detecting a leak between separate first and second fluid paths of a heat exchanger arranged in heat exchange relationship, the method comprising:

sealing a test section including said first and second fluid paths wherein said test section has first and second ends;

evacuating said first and second fluid paths;

introducing a test gas to said first fluid path so that a pressure differential is created between said first fluid path and said second fluid path, wherein said first and second fluid paths are each evacuated to a substantially sub-atmospheric pressure prior to introducing said test gas to said first fluid path; and testing for the presence of said test gas in said second fluid path whereby the presence of a leak between said first and second fluid paths of said test section may be determined, wherein said second fluid path is evacuated at or near to one end of said test section and said test gas is introduced at or near to the other end of said test section within said first fluid path.

2. A method according to claim 1, wherein said first and second fluid paths are evacuated to substantially the same pressure prior to introducing said test gas to said first fluid path.

3. A method according to claim 2, wherein said first and second fluid paths are evacuated to a pressure of about 0.1 bar or less.

4. A method according to claim 1, wherein said test gas is introduced to said first fluid path to a pressure of about 4 bar.

5. A method according to claim 1, wherein prior to testing for the presence of test gas in said second fluid path, a tracer gas is introduced to said second fluid path at or near one of said first or second ends of said test section and evacuated from said second fluid path at or near one of said first or second ends of the test section.

6. A method according to claim 5, wherein said tracer gas is introduced to said second fluid path and the presence of said test gas in said second fluid path is detected by collecting and testing tracer gas evacuated from said second fluid path.

7. A method according to claim 6, wherein the step of introducing said tracer gas to said second fluid path is repeated.

8. A method according to claim 5, wherein a controlled flow of said tracer gas is introduced to said second fluid path and detection of test gas in tracer gas evacuated from said one end of the second fluid path used to locate the position of a leak between said first and second fluid paths.

9. A method according to claim 1, wherein said test gas is hydrogen.

10. A method according to claim 1, wherein said test gas comprises a mixture of hydrogen and an inert gas.

11. A method according to claim 1, further including prior to sealing said test section one or more of cleaning, draining and drying said test section.

12. A method according to claim 1, wherein said heat exchanger is a plate heat exchanger.

* * * * *